F. A. NAUTS.
PERAMBULATOR.
APPLICATION FILED DEC. 14, 1907.

1,024,144.

Patented Apr. 23, 1912.
5 SHEETS—SHEET 1.

F. A. NAUTS.
PERAMBULATOR.
APPLICATION FILED DEC. 14, 1907.

1,024,144.

Patented Apr. 23, 1912.
5 SHEETS—SHEET 3.

Witnesses
Inventor
Frank A. Nauts.
By Whittemore, Hulbert & Whittemore
attys

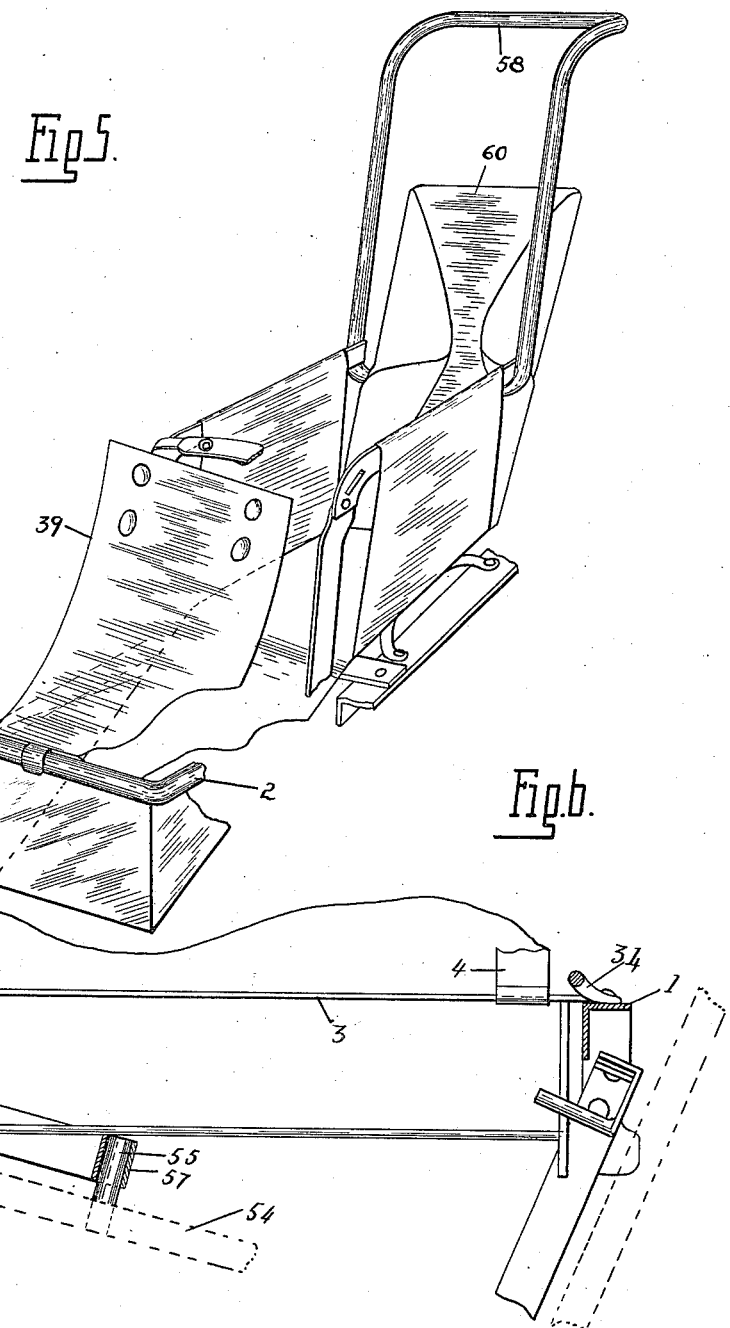

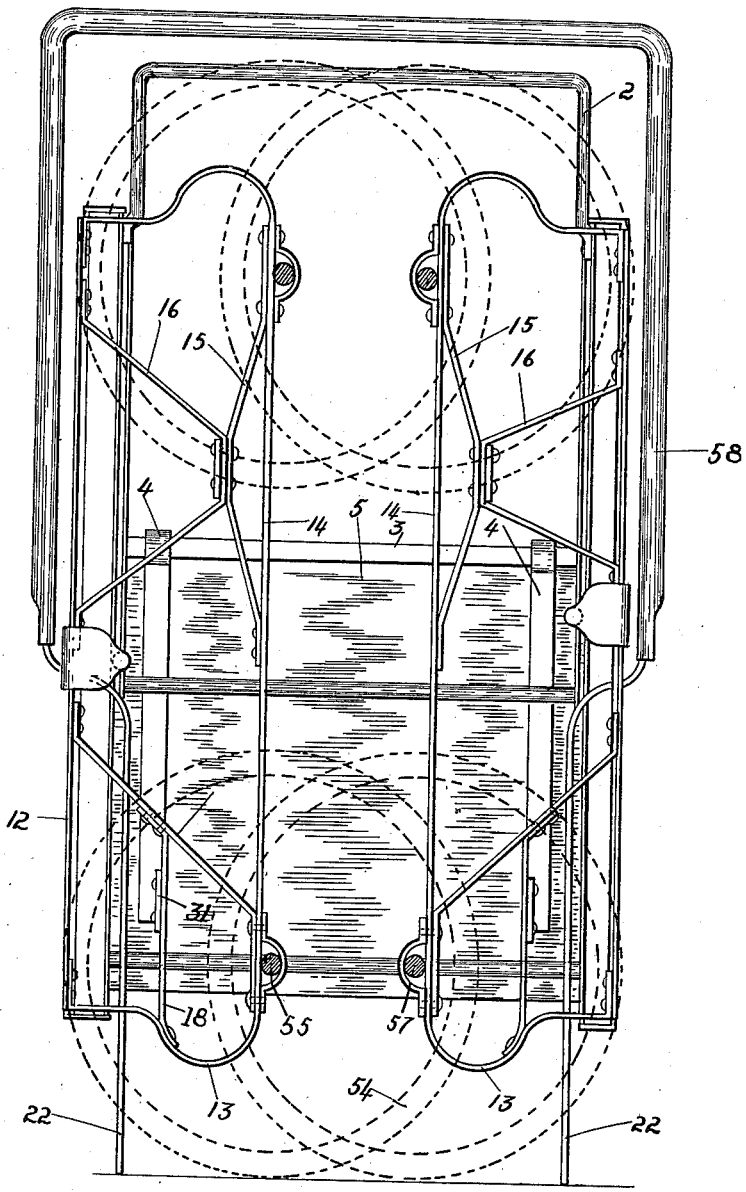

UNITED STATES PATENT OFFICE.

FRANK A. NAUTS, OF TOLEDO, OHIO, ASSIGNOR TO GENDRON WHEEL COMPANY, OF TOLEDO, OHIO, A CORPORATION OF OHIO.

PERAMBULATOR.

1,024,144.  Specification of Letters Patent.  Patented Apr. 23, 1912.

Application filed December 14, 1907. Serial No. 406,441.

*To all whom it may concern:*

Be it known that I, FRANK A. NAUTS, a citizen of the United States of America, residing at Toledo, in the county of Lucas and State of Ohio, have invented certain new and useful Improvements in Perambulators, of which the following is a specification, reference being had therein to the accompanying drawings.
The invention relates to new and useful improvements in perambulators, and consists in a construction embodying a main frame, wheel frames pivoted thereto, and in the mechanism required to unlock and fold in the wheel frames by the folding down of the standards or upright members.

The invention further consists in the construction of such device arranged with an extension from the frame, combined with the wheels to make a rest or feet upon which the device when collapsed may be stood upright; further in the construction of the frame, and in the construction, arrangement and combination of the various parts, as more fully hereinafter described and particularly pointed out in the claims.

Figure 1:
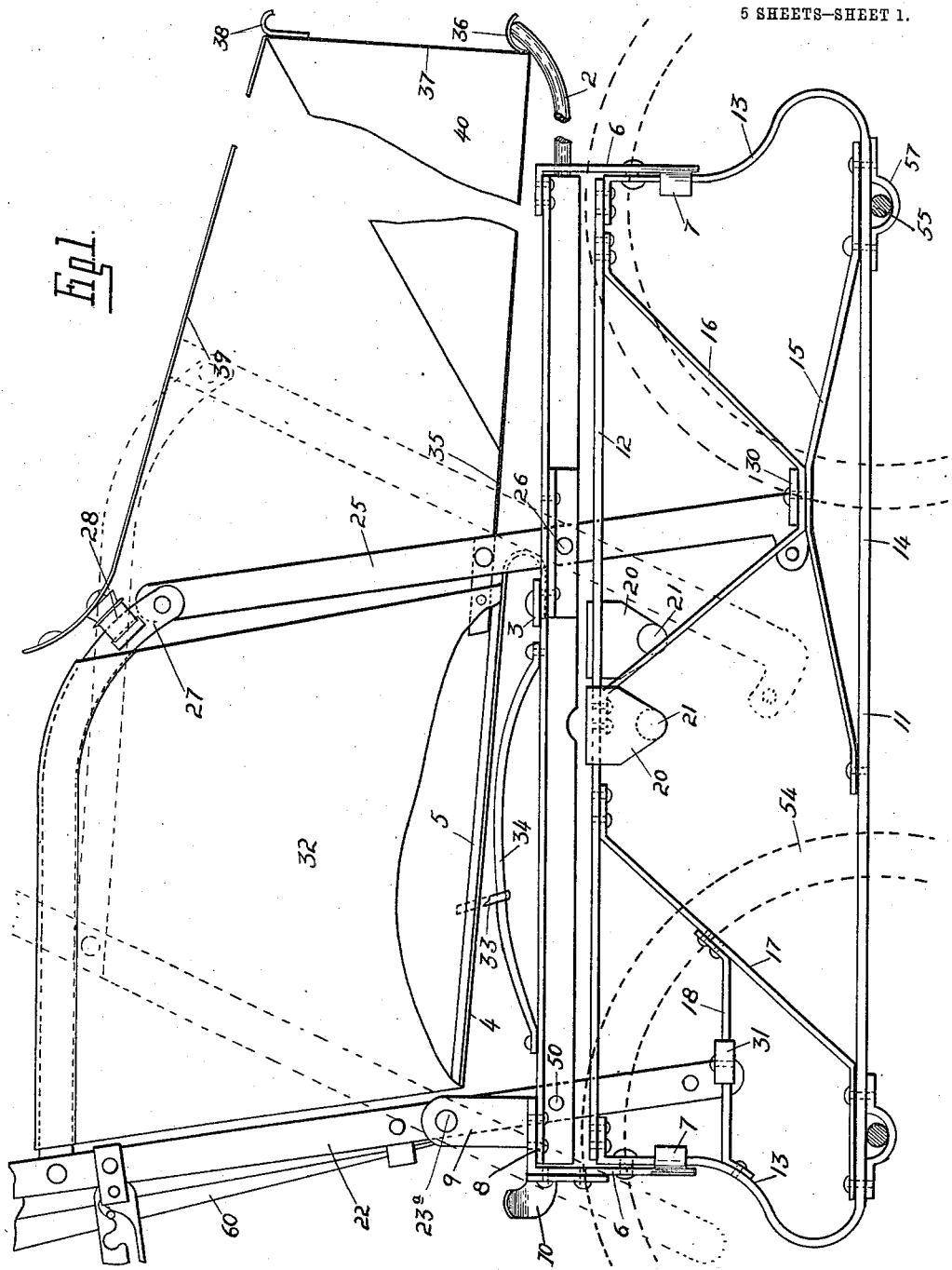
Figure 2:
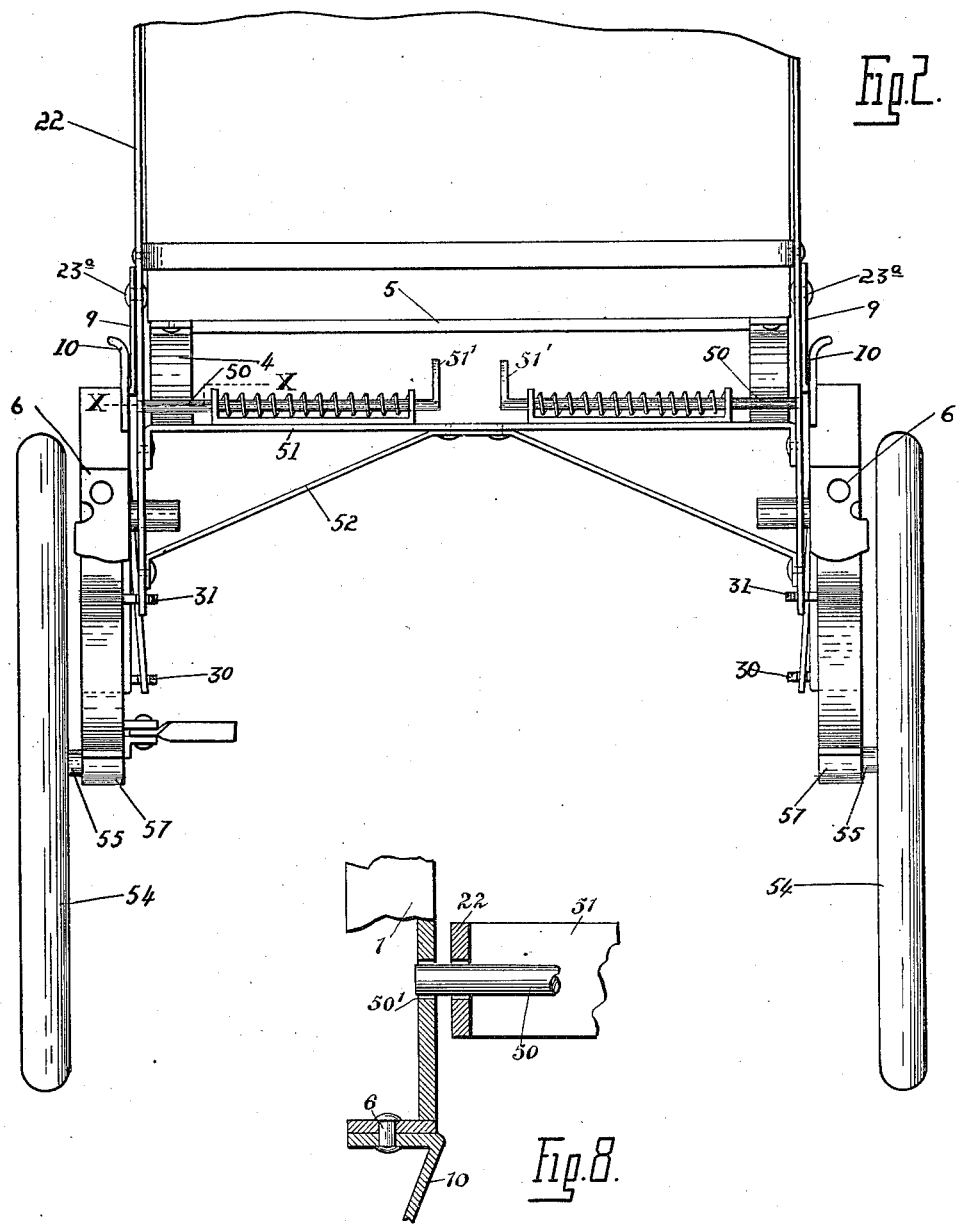
Figure 3:
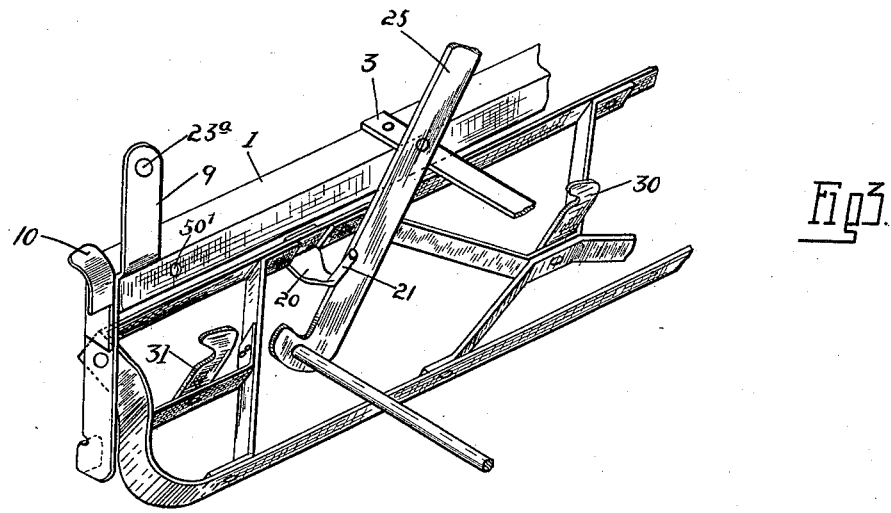
Figure 4:
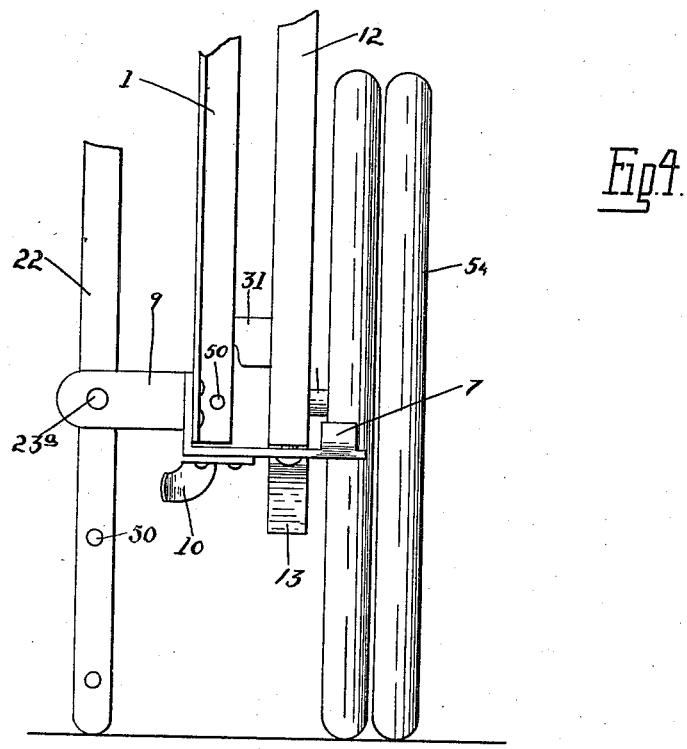

In the drawings, Figure 1 is a side elevation of the frame, wheel frames, seat and foot rest of my device, the wheels being indicated merely, in full lines the device being shown in its open or operative position, and in dotted lines the standards being shown partially moved to their closed or folded position; Fig. 2 is a rear elevation of the devices shown in Fig. 1; Fig. 3 is a perspective view of the rear portion of one side of the main frame, showing the wheel frames and the forward or arm standard partially folded down, illustrating the manner of folding in the wheel frames by means of the arm standard; Fig. 4 is an elevation of the lower part of the device in its folded position, illustrating how the feet are formed; Fig. 5 is a perspective view of a portion of the main frame, the seat, foot rest and handle; Fig. 6 is a section through the main frame near the middle, showing the wheel frames partially folded in; Fig. 7 is a bottom plan view of the main frame and wheel frames, the wheels being indicated by circles and the wheel frames being folded in, the handle being folded down in position. Fig. 8 is a section on line X—X, Fig. 2.

The main frame consists of the two side bars, 1, which I have shown as made of angle iron. At their forward ends they have connected to them the bail-shaped extension 2, preferably made of round iron and bent upwardly at its forward end as shown in Fig. 1. At the middle the two side bars are connected by the cross-bar or tie 3. To this cross-bar are secured the two U-shaped springs 4, which extend rearwardly and support the seat 5. At their rear ends the side bars 1 have secured thereon the downwardly extending lugs 6, which are provided on their outer faces with the lugs 7. The rear lugs 6 are formed preferably as part of the brackets 8, which have formed integral therewith the upstanding ears 9, one on each bracket. They also have preferably formed integral therewith the curved cams 10. Pivoted in the lugs 6 are the wheel frames 11. Each of these wheel frames I have shown as consisting of an upper longitudinal member 12, the two end members 13, which extend down substantially vertically, and the lower connecting member 14. In this case I have shown the members 13 and 14 as made of a single piece, bent as shown. On the lower member 14 is the truss 15, to which is connected the truss 16 from the upper member, the two being connected centrally as shown in Fig. 1.

17 is an inclined brace from the upper member to the lower member, and 18 is a tie connecting the rear member 13 and the brace 17. On each wheel frame is a bracket 20, having an inwardly extending pin 21, the function of the pins being to act as cranks by means of which the wheel frames may be turned inwardly.

Pivoted to the ears 9 are the uprights 22, which form what I shall call the rear standards or the handle. I preferably secure them to or pivot them on the cross bar 23ª, which acts to space them apart, and acts in effect as a rear spacing or tie member for the frame.

25 are uprights or standards pivoted on pivots 26 in the side bars about midway the length thereof, and these form the forward standards or arm rest standards. At their upper ends these standards 25 are connected with the standards 22 by means of links or arm rests 27, these being pivotally connected at each end. These links may be connected by the usual straps 28, used to hold the child on the seat of the vehicle.

As shown in Fig. 1, the standards 22 and the standards 25 project below their pivotal supports and below the frame. The lower ends of the standards 25 are adapted to engage with the sides of the wheel frame to hold it rigidly in position when in its upright or operative position. In this position the bars 13 of the wheel frame are held tightly against the stops 7. I may and preferably do provide notched lugs 30 in which the lower ends of the standards 25 engage to lock the wheel frames against movement in either direction, but it will be sufficient to accomplish the purpose desired if these standards simply have a bearing against the inner faces of the wheel frames to hold them tightly against the lugs 7. I also provide notched lugs 31 in which the lower portion of the handle standards 22 may engage for the same purpose. The lugs 31 I have shown as secured to the cross bar 18 and the lugs 30 to the brace or truss 16.

Secured to the arm rests 27 at either side of the vehicle are the sides 32. These are preferably of leather or some other flexible material, and at their lower ends they are provided with the lugs 33 engaging the guide rods 34 secured on the top of the side bars of the frame, thus holding the sides tightly down in position and allowing the device to be folded up without danger of injuring the same.

At the forward edge of the seat is secured the foot rest or boot, which consists preferably of the bottom piece 35, having at its ends the hooks 36 adapted to engage the cross-bar of the forwardly extending bail-shaped member of the frame 2, when the device is adjusted as shown in Fig. 1. At the forward end of the bottom piece is the upward extension 37, which at its upper end has the hooks 38, which likewise may be engaged with the cross-bar of the bail-shaped member 2 when the hooks 36 are disengaged and allowed to drop to a lower position. The upper end of the extension 37 has secured to it the apron 39, which extends forwardly up over the lap of the child and may be secured by buttons or otherwise to the strap 28. This permits of the arranging of the feet of the child in a horizontal position or in an inclined position, which they naturally would assume in sitting in such a vehicle, and at the same time provides a boot or foot rest therefor. I preferably provide the sides 40 on the foot rest. All these parts, that is 35, 37, 39 and 40, are preferably made of leather or some textile fabric.

At the rear of the device I provide two spring bolts 50 sliding in guides on the cross bar 51 carried by the standards 22, and which is preferably braced by the braces 52, as shown in Fig. 2. These spring bolts are adapted to engage apertures 50' in the side members of the angle-shape side bars of the frame. When the device is to be folded, the spring bolts may be disengaged from the side bars by pressing the upturned ends 51' 51' of the spring bolts toward each other. The cams 10 are in the path of the spring bolts 50, so that when the standards are moved from the folded position of the parts to the opposite position, the ends of the spring bolts will strike these cams, and be pressed inward so as to be in proper position to enter the holes 50', in which they project in the locked position. The wheels I have indicated at 54, and they are supported on the wheel frames. I have shown this accomplished by means of the pins 55 secured to the lower edges of the wheel frames by the loops 57. The handle is provided at its upper end with the usual cross-bar 58.

The parts being thus constructed, their operation is as follows—In the operative position of the parts, as shown in Fig. 1, the wheel frames are in vertical position, and are held there by the stops 7 and the standards 22 and 25 and the bolts 50. When it is desired to collapse the vehicle the operator presses the bolts to their inner position, and then turns down the handle, which moves the uprights 22 and likewise the uprights 25. In moving these uprights from the vertical position to the position parallel with the frame of the device, the uprights 25 will successively strike the pins 21 upon the brackets 20 of the wheel frames, and turn in these wheel frames as shown in Figs. 3 and 6, one being over the other, before such successive operations. When the parts are entirely collapsed, the uprights 22 and 25 will lie parallel with the frames, and the wheels will be folded thereon. The end of the upright 22 which extends beyond the pivot is of such a length that in the folded position it will extend to the same plane as the edges of the wheels, so that the two uprights, with the two bearings which the wheels give, will form separated feet upon which the device may be stood in an upright position, in its collapsed condition. To open it again the operator takes hold of the cross-bar of the bail-shaped member 2 and the cross-bar 58 of the handle, and opens the device. In this opening movement the standard 25 will strike the inclined truss or brace member 16, and thus force the wheel frame to a vertical position. When they have reached their proper position the lock will automatically engage with the aperture in the side bar and hold them there until the lock is again released.

60 is the back of the device, which as usual in these devices may be turned at various angles to the seat, so that the child may sit upright or recline as desired.

What I claim is—

1. In a collapsible perambulator, the combination with a frame, of wheels pivotally secured thereto, standards pivoted to said frame, arm-rests connecting said standards, a U-shaped spring having one end thereof connected to the side bars of the frame, a seat supported on said spring, sides for said seat secured at their upper edges to the arm-rests, and guide rods on the frame with which the lower edge of said sides engage.

2. In a collapsible perambulator, the combination of a frame, wheel frames pivoted to the first-mentioned frame, front and rear wheels carried by said frame, front and rear standards pivotally connected to said frame, links connecting said standards, means on said wheel frames coöperating with said standards for effecting the folding in of the wheel frames upon the folding of the standards, spring pressed means carried by said rear standards for automatically locking said standards in their vertical or normal positions, and cams on said perambulator frame for guiding said spring pressed means into inoperative position during the unfolding of said standards.

3. In a collapsible perambulator, the combination with the frame, of wheel frames pivotally secured to the opposite sides thereof, each of said pivotal frames comprising upper and lower longitudinally extending members, end connections for said members, and braces extending between the upper and lower members.

4. In a collapsible perambulator, the combination with the frame, of wheel frames pivotally secured to the opposite sides thereof, each of said pivotal frames comprising upper and lower longitudinally extending members, end connections for said members and transversely and longitudinally extending braces, front and rear connected standards pivoted to and extending below the perambulator frame and bearings carried by said longitudinally extending braces with which said standards engage in the open position of the wheel frames for preventing inward movement of the latter.

5. In a collapsible perambulator, the combination with a frame, of wheels pivotally secured thereto, standards pivoted to said frame, arm rests connecting said standards, a spring secured to the frame, a seat supported on said frame, sides for said seat secured at their upper edges to the arm rests, and guide rods on the frame to which the lower edges of said sides are secured.

6. In a collapsible perambulator, the combination with a frame including spaced side bars, a cross bar connecting said side bars intermediate the ends of the latter, wheel frames pivoted to the side bars, standards pivoted to the frame, arm rests connecting said standards, a U-shaped spring having one end connected to said cross bar, and a seat secured to and supported by said spring independent of said standards and arm rests.

7. In a collapsible perambulator, the combination with the frame, of wheel frames pivotally secured to the opposite sides thereof, each of said wheel frames comprising upper and lower longitudinally extending members, front and rear end connections for said members, a transversely extending brace connecting the upper and lower members, a longitudinally extending brace secured to the transverse brace and to the rear end connection, and a bearing secured to the longitudinally extending brace, and standards pivoted to and extending below the perambulator frame, said extensions being adapted to engage the bearings upon the longitudinally extending braces in the open position of the wheel frames so as to prevent inward movement of the latter.

8. In a collapsible perambulator, the combination with a frame including spaced side bars, a cross bar connecting said side bars intermediate the ends of the latter, standards pivoted to the frame, arm rests connected to the standards, and a plurality of U-shaped springs each having one end secured to said cross bar and a seat secured to and supported by said springs independent of said standards and arm rests.

9. In a collapsible perambulator, the combination with a frame including spaced side bars, a cross bar connecting said side bars intermediate the ends of the latter, and a U-shaped spring having one leg of the U comparatively short and secured to said cross bar, the other leg being elongated, and a seat secured to and supported by said elongated leg.

In testimony whereof I affix my signature in presence of two witnesses.

FRANK A. NAUTS.

Witnesses:
  JOSHUA F. VOGEL,
  A. F. CONNOLLY.

---

Copies of this patent may be obtained for five cents each, by addressing the "Commissioner of Patents, Washington, D. C."